W. G. DUNN.
GEAR SHIFTING MECHANISM FOR MOTOR VEHICLES.
APPLICATION FILED NOV. 14, 1921.
1,434,993.
Patented Nov. 7, 1922.
2 SHEETS—SHEET 1.
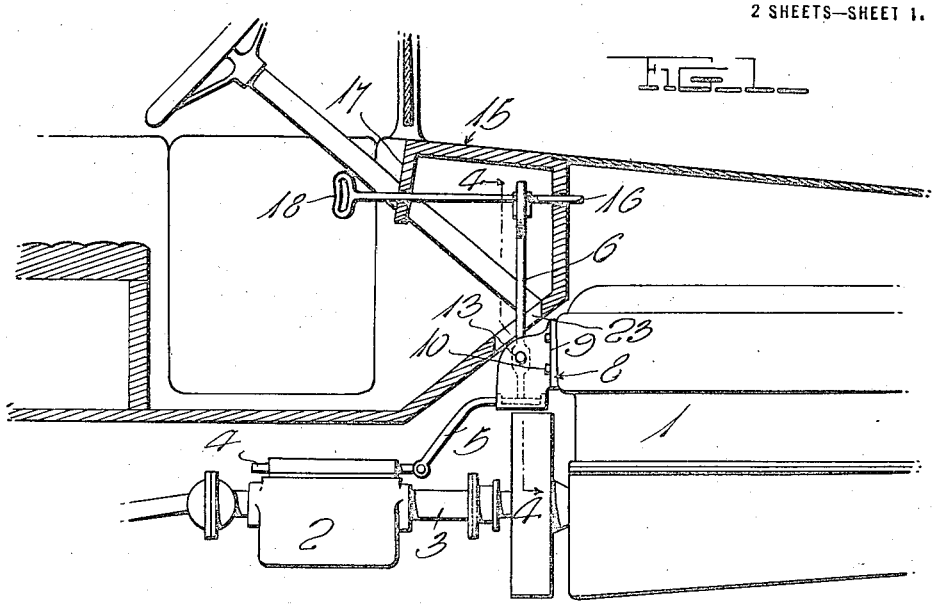
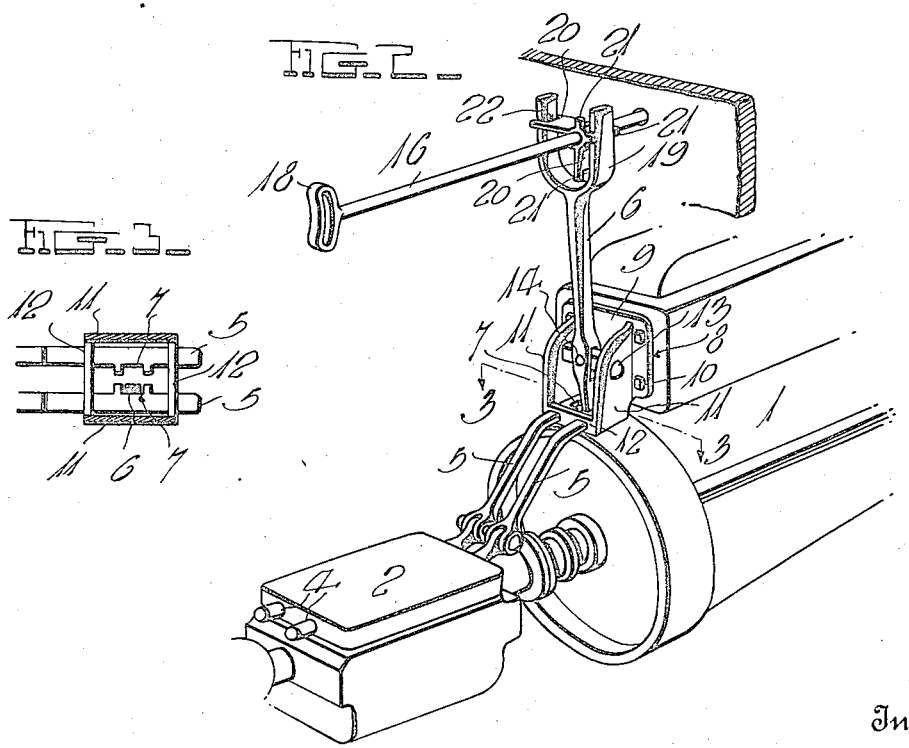
Witness
H. Woodard
Inventor
W. G. Dunn
By H. A. Williamson & Co.
Attorneys

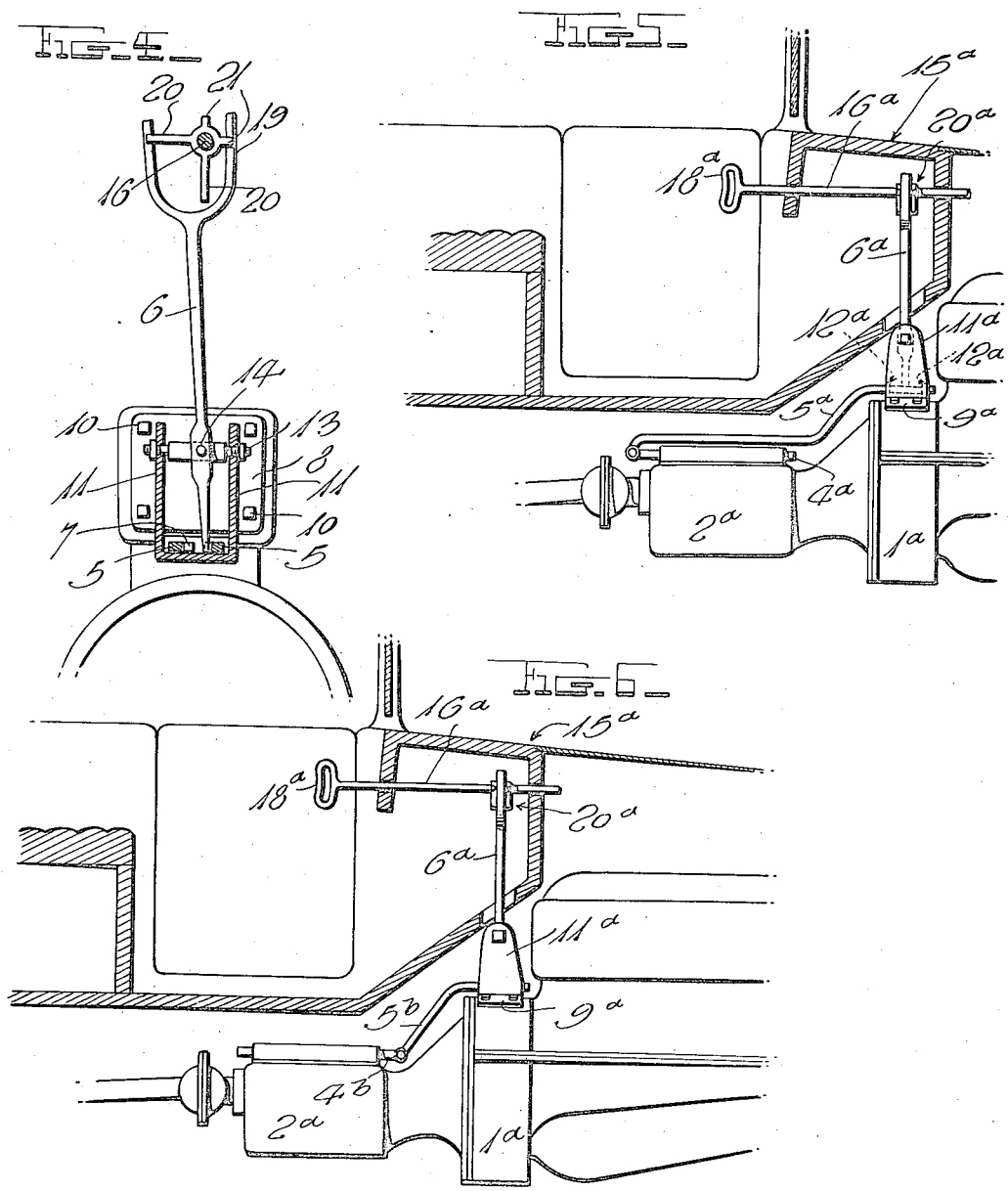

Patented Nov. 7, 1922.

1,434,993

UNITED STATES PATENT OFFICE.

WILLIAM G. DUNN, OF CLARINDA, IOWA.

GEAR-SHIFTING MECHANISM FOR MOTOR VEHICLES.

Application filed November 14, 1921. Serial No. 515,026.

*To all whom it may concern:*

Be it known that I, WILLIAM G. DUNN, a citizen of the United States, residing at Clarinda, in the county of Page and State of Iowa, have invented certain new and useful Improvements in Gear-Shifting Mechanism for Motor Vehicles; and I do declare the following to be a full, clear, and exact description of the invention, such as will enable others skilled in the art to which it appertains to make and use the same.

My invention relates to improvements in gear shifting mechanism for automobiles, and other motor vehicles, and has for one of its objects to generally improve and simplify the construction shown in my U. S. Patent No. 1285076 of Nov. 19, 1918. In attaining this end, a further object is to construct the gear shifting means of two units, one being carried by the body of the machine and the other being mounted entirely on the chassis, novel provision being made so that the one unit is entirely removable from connection with the other unit when the body of the machine is moved from the chassis. This overcomes the necessity of removing any bolts or other connections in order to remove the body of the machine and also permits use of the chassis-carried unit for the purpose of shifting gears whenever running the chassis without the body thereon.

A further object is to provide a novel arrangement of parts which permits the vertical gear shifting lever to be mounted on a bracket suitably secured to the motor, so that any slight relative movement between the body of the machine and the transmission mechanism, will not in any manner, move the mounting means of the lever.

With the foregoing and minor objects in view, the invention resides in the novel construction, combination and arrangement of parts hereinafter fully described and claimed, the descriptive matter being supplemented by the accompanying drawings.

Figure 1 is a longitudinal sectional view, partly in elevation, showing the application of my invention to an automobile.

Figure 2 is a perspective view of the gear shifting mechanism and associated parts.

Figure 3 is a horizontal sectional view as indicated by line 3—3 of Fig. 2.

Figure 4 is a vertical transverse sectional view as indicated by line 4—4 of Fig. 1.

Figs. 5 and 6 are views similar to Fig. 1, showing different features of construction.

In the drawings above briefly described, (Figs. 1, 2 and 4) I have shown my invention applied to a form of automobile motor 1 and transmission 2 which are separated from each other except for the drive-shaft 3 extending between them. The transmission 2 is of the usual or any well known formation and is provided with gear shifting rods 4 whose front ends are equipped with forwardly directed extensions 5 for co-action with a preferably upright gear shifting lever 6, the front ends of said extensions being provided with seats 7 shown in Fig. 3, into either of which the lower end of the lever 6 may be moved, whereby said lever may be used to shift either extension and rod 4 to set the transmission mechanism for different speeds and for reversing. The lever 6 is mounted on a bracket 8 which comprises an attaching plate 9 secured at 10 to the rear end of the motor block, vertical flanges 11 extending from said attaching plate, and guides 12 extending between the lower ends of said flanges 11. The guides slidably mount the rod extensions 5 and the flanges 11 serve as mounting means for the lever 6, which lever is positioned between said flanges and fulcrumed for movement both longitudinally of the machine and transversely thereof upon two axes 13 and 14 respectively.

The construction so far described forms the chassis-carried unit of my invention, the other unit thereof which is carried by the body 15 of the machine, being here shown in the form of a longitudinally extending control rod 16 extending rearwardly through the instrument board 17 and provided with a suitable hand grip 18. Connecting means are employed between the control rod 16 and the lever 6, so that when said rod is rotated, the lever 6 will be laterally rocked upon the axis 14 to engage its lower end with either of the seats 7, said connecting means also acting to transmit longitudinal movement from the rod 16 to the lever 6 so that the rod extensions 5 and the rods 4 may be moved to shift the gears. The connecting means is of such formation that the body-carried and chassis-carried units of the gear shifting mechanism are entirely movable from connection with each other when the body and chassis are relatively moved to remove said body from the machine. A preferred form of connecting means is shown, consisting of a fork 19 on the upper end of lever 6 and relatively long and short arms 20 and 21 respectively carried by the rod 16, the outer ends of these arms being notched at 22 to engage the fork arms as shown, for instance in Figs. 2 and 4. These arms act as an eccentric to laterally shift the lever 6 when the control rod 16 is rotated, and it will be seen that since the arms of the fork 19 are received in the notches 22, a connection is established between the lever 6 and the rod 16 so as to longitudinally rock the lever 6 upon its axis 13, when the control rod is moved forwardly or rearwardly. When the body 15 is removed and the arms 20 and 21 withdraw from the fork 19, said fork is movable through an opening 23 in the floor of the machine so that it is not necessary to loosen or remove any floor boards. Furthermore, when the body is removed, the chassis of the machine may still be run under its own power, by utilizing the standing lever 6 to shift the gears.

In Fig. 5 I have shown a somewhat different construction and arrangement of parts. In this view, the motor is provided with a fly-wheel casing 1ª and this casing is integral with the front end of the transmission casing 2ª. The transmission mechanism is provided with gear shifting rods 4ª to which extensions 5ª are connected in any suitable manner, these extensions being here shown extending rearwardly over the transmission case. The front ends of the extensions 5ª are received in guides 12ª extending between the lower ends of vertical flanges 11ª which rise from an attaching plate 9ª of a suitable carrying bracket for the gear shifting lever 6ª, said attaching plate 9ª being secured to the fly-wheel housing 1ª instead of to the rear end of the cylinder block as shown in Fig. 1. It will be understood however that the two forms of brackets are shown merely to illustrate two ways of adapting my invention to different well known types of automobile motors.

In the construction shown in Fig. 5, the control rod 16ª is carried by the body 15ª of the machine, is provided at its rear end with a suitable handle 18ª, and is detachably connected with the lever 6 as indicated at 20ª, this detachable connection being of the same type as that above described.

In the construction shown in Fig. 6, rod extensions 5ᵇ are connected to the front ends of the gear shifting rods 4ᵇ but otherwise the construction is identical with that shown in Fig. 5, and hence, the same reference characters have been used on the remaining parts.

In operating any form of my improved gear shifting mechanism, it is simply necessary to first turn the control rod 16 in the proper direction to shift the lower end of the lever 6 into engagement with the seat 7 of the correct rod extension 5 and to then slide said rod 16 forwardly or rearwardly as required. The gears may thus be shifted in the same manner as if a control lever were vertically extended from the transmission 2, as in most machines now on the market. It will be obvious however that with my invention, the floor of the automobile is entirely unobstructed and furthermore, the control 18 is easily accessible to the driver, even when he is using a lap robe. This is greatly advantageous over the common forms of gear shifting levers, since unless both occupants on the front seat use separate lap robes, the lever is covered by the robe and it is a difficult matter to reach the same when necessary.

Since excellent results may be obtained from the several details shown and described, such details may be followed if desired. I wish it understood however that the present disclosure is for illustrative purposes only and that within the scope of the invention as claimed, numerous changes may be made.

I claim:

1. A motor vehicle having gear shifting means composed of chassis-carried and body-carried units held in engagement with each other by engagement of the body with the chassis, said units being freely movable from each other by movement of the body from the chassis.

2. A motor vehicle having a floor opening near its dash, a chassis-carried gear shifting lever rising through said opening, a body-carried control member for said lever, and connecting means between said lever and control member separable when the body and chassis are relatively moved to remove said body.

3. A motor vehicle having a floor opening near its dash, a chassis-carried gear shifting lever rising through said opening, and having a fork on its upper end, and a control member for said lever carried by the body of the machine and received in said fork, said control member being removable from said fork when the chassis and body are relatively moved when removing the latter.

4. A motor vehicle having a transmission mechanism in rear of its motor and sliding rods for shifting gears of said transmission mechanism, said rods having extensions reaching beyond the transmission mechanism, a control member spaced above the floor of the vehicle and disposed in front of the driver's seat, and means extending downwardly from said control member adjacent the dash of the machine for operatively connecting said control member with said rod extensions.

5. A motor vehicle having a transmission mechanism in rear of its motor and sliding rods for shifting gears of said transmission mechanism, said rods having extensions reaching beyond the transmission mechanism, a control member spaced above the floor of the vehicle and disposed in front of the driver's seat, a motor carried bracket, and means mounted on said bracket for operatively connecting said control member with said rod extensions.

6. A motor vehicle having a transmission mechanism in rear of its motor and sliding rods for shifting gears of said transmission mechanism, said rods having extensions reaching beyond the transmission mechanism, a control member spaced above the floor of the vehicle and disposed in front of the driver's seat, a motor carried bracket having guiding means for said rod extensions, and means mounted on said bracket for operatively connecting said control member with said rod extensions.

7. A motor vehicle having a motor-carried bracket behind the cylinders of the motor, a substantially upright gear shifting lever fulcrumed to said bracket, means for connecting the lower end of said lever operatively with the gear shifting means of the transmission mechanism of the vehicle, and a control member operatively connected with and extending rearwardly from the upper end of said lever.

8. A motor vehicle having a transmission mechanism in rear of its motor and gear shifting rods for said mechanism provided with extensions leading beyond the transmission mechanism, a bracket comprising an attaching plate secured to the motor, spaced vertical flanges extending from said attaching plate and guides adjacent the lower ends of said flanges receiving said rod extensions, and shifting means for said rod extensions mounted between said flanges.

9. A motor vehicle having a transmission mechanism in rear of its motor and sliding rods for shifting gears of said transmission mechanism, said rods having extensions leading beyond said transmission mechanism, guiding means for said extensions, a substantially vertical lever fulcrumed to swing laterally into operative engagement with either rod extension and also movable forwardly and rearwardly to move said extensions for gear shifting, and a control member connected with and extending rearwardly from the upper end of said lever.

10. A motor vehicle having a transmission mechanism in rear of its motor and sliding rods for shifting gears of said transmission mechanism, said rods having extensions leading beyond said transmission mechanism, guiding means for said extensions, a substantially vertical lever fulcrumed to swing laterally into operative engagement with either rod extension and also movable forwardly and rearwardly to move said extensions for gear shifting, a control member connected with and extending rearwardly from the upper end of said lever, and means mounting said control member for movement in two ways, whereby it may be moved in one manner to first operatively engage said lever with either rod extension and then moved in the other manner to operate said lever and longitudinally shift the rod extension engaged thereby.

11. A motor vehicle having a transmission mechanism in rear of its motor and sliding rods for shifting gears of said transmission mechanism, said rods having extensions leading beyond said transmission mechanism, guiding means for said extensions, a substantially vertical lever fulcrumed to swing laterally into operative engagement with either rod extension and also movable forwardly and rearwardly to move said extensions for gear shifting, a longitudinally disposed control member mounted for sliding and rotation, and means connecting said control member with the upper end of said lever for laterally shifting the lever when said control member is rotated and for rocking said lever forwardly or rearwardly when said control member is slid.

12. A structure as specified in claim 11; said connecting means for said lever and control member consisting of a fork on the lever, and lateral arms on the control member engaged with said fork.

13. The combination with a lever movable laterally, forwardly and rearwardly for gear shifting; of a fork on the upper end of said lever, a substantially horizontal control rod mounted slidably and rotatably adjacent said lever, and lateral arms on said rod engaged with said fork.

In testimony whereof I have hereunto set my hand.

WILLIAM G. DUNN.